(12) United States Patent
Fang

(10) Patent No.: US 10,277,630 B2
(45) Date of Patent: Apr. 30, 2019

(54) MOBILENET

(75) Inventor: Wen Fang, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 464 days.

(21) Appl. No.: 13/153,290

(22) Filed: Jun. 3, 2011

(65) Prior Publication Data

US 2012/0309352 A1     Dec. 6, 2012

(51) Int. Cl.
*H04L 29/06*     (2006.01)
*H04W 12/06*    (2009.01)
*H04W 4/021*    (2018.01)

(52) U.S. Cl.
CPC .............. *H04L 63/18* (2013.01); *H04L 63/08* (2013.01); *H04W 12/06* (2013.01); *H04L 63/0861* (2013.01); *H04W 4/021* (2013.01)

(58) Field of Classification Search
CPC ............... H04L 63/029; H04L 63/0428; H04L 12/4641; H04L 12/2818; H04L 2012/2841; H04L 63/0272; H04L 29/06; H04W 84/045; H04W 92/02; H04W 12/02; H04W 76/10; H04W 88/16; H04W 12/04; H04W 12/06; H04W 12/08; H04W 12/10
USPC .................. 455/410, 411; 380/247–250, 277
See application file for complete search history.

(56) References Cited

U.S. PATENT DOCUMENTS

| | | | |
|---|---|---|---|
| 6,714,979 B1 * | 3/2004 | Brandt | H04L 63/166 707/999.003 |
| 7,068,640 B2 * | 6/2006 | Kakemizu et al. | 370/349 |
| 7,774,455 B1 * | 8/2010 | Tock et al. | 709/224 |
| 8,326,981 B2 * | 12/2012 | Tock et al. | 709/224 |
| 2004/0218611 A1 * | 11/2004 | Kim | H04L 12/4633 370/401 |

(Continued)

FOREIGN PATENT DOCUMENTS

CN     101151849 A     3/2008
CN     101309272 A    11/2008
(Continued)

OTHER PUBLICATIONS

International Search Report, Application Ser. No. PCT/US2012/038745, dated Sep. 5, 2012.
(Continued)

*Primary Examiner* — Olumide Ajibade Akonai
(74) *Attorney, Agent, or Firm* — Haynes and Boone, LLP

(57) ABSTRACT

A system, method, and apparatus for establishing communications with a secure network using a non-secure mobile device operating in a non-secure network are disclosed herein. The disclosed method involves communicating a mobile device identifier to the secure network. In one or more embodiments, the mobile device identifier is an Internet protocol (IP) address and/or a unique identification (ID) code. The method further involves verifying and/or validating, with a mobile device manager in the secure network, the mobile device identifier. Also, the method involves establishing a secure connection between the mobile device and the secure network. In addition, the method involves receiving, with the mobile device, encrypted secure data from the secure network. Further, the method involves decrypting, with the mobile device, the received encrypted secure data using previously downloaded mobile device security software.

65 Claims, 4 Drawing Sheets

(56) References Cited

U.S. PATENT DOCUMENTS

| | | | |
|---|---|---|---|
| 2005/0198380 A1* | 9/2005 | Panasyuk | H04L 12/4633 709/239 |
| 2006/0294595 A1* | 12/2006 | Drihem | 726/27 |
| 2007/0143837 A1 | 6/2007 | Azeez et al. | |
| 2008/0170699 A1* | 7/2008 | Fratti et al. | 380/278 |
| 2008/0184123 A1* | 7/2008 | Shuqair et al. | 715/733 |
| 2008/0209221 A1* | 8/2008 | Vennelakanti et al. | 713/183 |
| 2008/0232382 A1* | 9/2008 | Iwama et al. | 370/401 |
| 2008/0268815 A1* | 10/2008 | Jazra et al. | 455/411 |
| 2009/0023423 A1* | 1/2009 | Buer et al. | 455/411 |
| 2009/0097491 A1* | 4/2009 | Suginaka | H04L 12/2898 370/401 |
| 2009/0100514 A1 | 4/2009 | Jin et al. | |
| 2009/0187492 A1* | 7/2009 | Hammad et al. | 705/26 |
| 2009/0292816 A1* | 11/2009 | Etchegoyen et al. | 709/229 |
| 2010/0031339 A1* | 2/2010 | Minnen | H04L 29/12009 726/12 |
| 2010/0146500 A1* | 6/2010 | Joubert et al. | 717/178 |
| 2010/0299517 A1* | 11/2010 | Jukic et al. | 713/150 |
| 2011/0252230 A1* | 10/2011 | Segre | H04L 63/162 713/155 |
| 2011/0252240 A1* | 10/2011 | Freedman et al. | 713/169 |
| 2012/0023325 A1* | 1/2012 | Lai | 713/155 |
| 2012/0096259 A1* | 4/2012 | Kao et al. | 713/155 |
| 2013/0046976 A1* | 2/2013 | Rosati et al. | 713/168 |

FOREIGN PATENT DOCUMENTS

| | | |
|---|---|---|
| CN | 10361082 | 2/2009 |
| EP | 2302865 A1 | 3/2011 |
| JP | H10-322328 A | 12/1998 |
| JP | 2004-151886 A | 5/2004 |
| JP | 2006-202052 A | 8/2006 |
| JP | 2006-279321 A | 10/2006 |
| JP | 2008-072441 A | 3/2008 |
| JP | 2010-282322 A | 12/2010 |

OTHER PUBLICATIONS

Gemalto: "EAP-SIM White Paper", Jan. 26, 2010, XP002681525, Retrieved from the Internet: URL:http://www.gemalto.com/brochures/download/wp_eap_sim.pdf [retrieved on Aug. 3, 2012], the whole document.

"3rd Generation Partnership Project; Technical Specification Group Service and System Assets; 3G Security; Wireless Local Area Network (WLAN) interworking security (Release 11)", 3GPP Standard; 3GPP TS 33.234, 3rd Generation Partnership Project (3GPP), Mobile Competence Centre; 650, Route Des Lucioles; F-06921 Sophia-Antipolis Cedex; France, No. V11.0.0, Mar. 30, 2011, pp. 1-101, XP050476601, [retrieved on Mar. 30, 2011], pp. 29-32, p. 73.

IPhone OS Enterprise Deployment Guide, Second Edition, for Version 3.2 or later, Apple Inc., 2010. (pp. 22-26).

Communication pursuant to Article 94(3) EPC dated Feb. 28, 2017 in European Patent Application No. 12 725 956.2-1853 (7pages).

Notification of First Office Action dated Sep. 13, 2016 in Chinese Application No. 201280027078.1, Applicant: The Boeing Company including an English Translations of the Office Action (18pages).

Japanese Office Action, Patent Application Ser. No. JP 2014-513553, prepared on May 30, 2016.

Japanese Office Action, Patent Application Ser. No. JP 2014-513553, prepared on Sep. 7, 2016.

* cited by examiner

MOBILENET

BACKGROUND

The present disclosure relates to establishing communications with a secure network. In particular, it relates to establishing communications with a secure network using a non-secure mobile device operating in a non-secure network.

SUMMARY

The present disclosure relates to a system, method, and apparatus for establishing communications with a secure network using a non-secure mobile device operating in a non-secure network. In particular, the disclosed method involves communicating a mobile device identifier to the secure network. The method further involves verifying and/or validating, with a mobile device manager in the secure network, the mobile device identifier. In one or more embodiments, the mobile device manager is a server that is essentially utilized as a verification device to verify the mobile device identifier. In addition, the method involves establishing a secure connection between the mobile device and the secure network.

In one or more embodiments, the mobile device identifier is communicated to the secure network via a cellular network, a Wi-Fi network, and/or an out-of-band network. In some embodiments, the method further involves sending, with the mobile device manager, a request for the mobile device identifier. In one or more embodiments, the mobile device identifier is an Internet protocol (IP) address. In at least one embodiment, the mobile device identifier is a unique identification (ID) code.

In one or more embodiments, the method further involves verifying and/or validating, with the mobile device manager, a user of the mobile device. In at least one embodiment, the user of the mobile device is verified and/or validated by using biometrics of the user. In some embodiments, the user of the mobile device and/or the mobile device itself is verified and/or validated by analyzing and/or determining the location of the mobile device.

In at least one embodiment, the method further involves receiving, with the mobile device, encrypted secure data from the secure network. Further, the method involves decrypting, with the mobile device, the received encrypted secure data using previously downloaded mobile device security software. In at least one embodiment, the previously downloaded mobile device security software is used to decrypt encrypted secure data and/or encrypt non-secure data. In one or more embodiments, the method further involves encrypting, with the mobile device, non-secure data using the previously downloaded mobile device security software; and transmitting, with the mobile device, the encrypted data to the secure network. In at least one embodiment, the mobile device security software comprises encryption software, decryption software, and/or forced fixed destination addressing software.

In one or more embodiments, a non-secure mobile device operating in a non-secure network used for establishing communications with a secure network involves a transmitter, a receiver, and a processor. The transmitter is configured for communicating a mobile device identifier to the secure network, and the receiver is configured for receiving encrypted secure data from the secure network. In addition, the processor is configured for decrypting the received encrypted secure data using previously downloaded mobile device security software. In at least one embodiment, the processor is further configured for encrypting non-secure data using the previously downloaded mobile device security software, and the transmitter is further configured for transmitting the encrypted data to the secure network.

In at least one embodiment, a method for establishing communications with a secure network using a non-secure mobile device operating in a non-secure network involves communicating a mobile device identifier to the secure network to establish a secure connection between the mobile device and the secure network. The method further involves establishing a secure connection between the mobile device and the secure network. Also, the method involves receiving, with the mobile device, encrypted secure data from the secure network. In addition, the method involves decrypting, with the mobile device, the received encrypted secure data using previously downloaded mobile device security software.

In one or more embodiments, a method for establishing communications with a secure network using a non-secure mobile device operating in a non-secure network involves receiving, with a receiver, a request with a mobile device identifier from the mobile device to establish a secure connection between the mobile device and the secure network. The method further involves verifying and/or validating, with a mobile device manager in the secure network, the mobile device identifier. In addition, the method involves establishing a secure connection between the mobile device and the secure network. Further, the method involves transmitting, with a transmitter, encrypted secure data from the secure network to the mobile device. In at least one embodiment, the mobile device is operating in a secure or non-secure cellular network and/or secure or non-secure Wi-Fi network. In some embodiments, the method further involves receiving, with the receiver, encrypted data transmitted from the mobile device; and decrypting, with a processor, the received encrypted data.

In at least one embodiment, a method for allowing for the establishment of communications with a secure network using a non-secure mobile device operating in a non-secure network involves communicating a request to the secure network to download mobile device security software. The method further involves downloading and installing, by the mobile device, the mobile device security software from the secure network. Also, the method involves activating, by the mobile device, the mobile device security software.

Additionally, the method involves transmitting, with the mobile device, a mobile device manager enrollment request to the secure network. Also, the method involves verifying and/or validating, with the mobile device manager, the mobile device based on a unique data item description (UDID) of the mobile device. Further, the method involves transmitting, by the mobile device manager, a mobile device identifier to the mobile device. The mobile device identifier allows for the mobile device to establish communications with the secure network.

In some embodiments, the method further involves including, with the mobile device manager, the phone number of the mobile device on a carrier access list, where subsequent encrypted data transmissions from mobile devices having their phone numbers on the carrier access list will be automatically routed to the secure network.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIG. 3A shows a diagram of a non-secure mobile device downloading, installing, and activating mobile device security software, in accordance with at least one embodiment of the present disclosure.

FIG. 3B shows a diagram of a non-secure mobile device transmitting a mobile device manager enrollment request and receiving a mobile device identifier, in accordance with at least one embodiment of the present disclosure.

DESCRIPTION

The methods and apparatus disclosed herein provide an operative system for establishing communications with a secure network. Specifically, this system relates to establishing communications with a secure network using a non-secure mobile device operating in a non-secure network. In particular, the present disclosure teaches a way for a non-secure mobile device, such as a personal digital assistant (PDA), to access a secure network. Currently, commercially available PDAs (e.g., iPhones and iPads) do not have security architecture to protect proprietary data. The present disclosure provides a system that allows for commercially available off-the-shelf, non-secure mobile devices operating in a non-secure network to be able to access secure networks. For at least one application of the present disclosure, soldiers deployed out in the field use off-the-shelf, non-secure mobile devices employing the disclosed system in order to transmit and receive data to and from a secure network. For some applications, soldiers use off-the-shelf, non-secure mobile devices employing the disclosed system to be able to have secure communications with one another.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
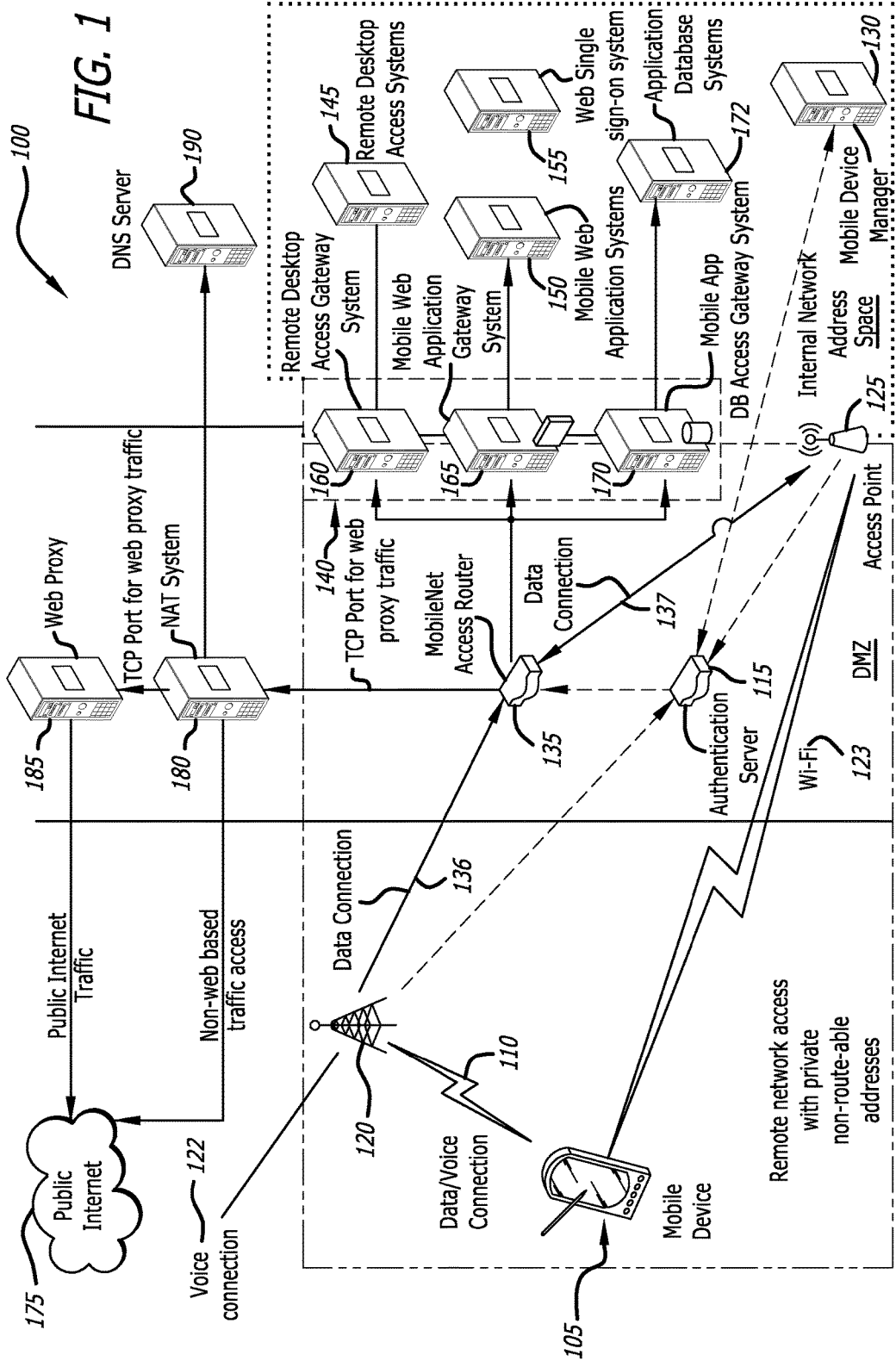
FIG. 1 shows an architectural diagram of a system for establishing communications with a secure network using a non-secure mobile device operating in a non-secure network, in accordance with at least one embodiment of the present disclosure.

FIG. 1 shows an architectural diagram of a system 100 for establishing communications with a secure network using a non-secure mobile device 105 operating in a non-secure network, in accordance with at least one embodiment of the present disclosure. In this figure, mobile device security software is downloaded onto the mobile device 105. The mobile device security software may be used for decrypting encrypted secure data and/or encrypting non-secure data and/or forcing data to be destined to specific addresses, including addresses in the demilitarized zone (DMZ) or secure network. Details of the installation procedure for the mobile device security software are presented in the discussions of FIGS. 3A, 3B, and 4.

In FIG. 1, during the operation of the system 100, the non-secure mobile device 105 first transmits a mobile device identifier to the secure network. In at least one embodiment, the mobile device 105 transmits the mobile device identifier to the secure network using a non-secure voice/data cellular connection 110 (e.g., a 3G/4G cellular connection). When doing so, the mobile device 105 transmits the mobile device identifier to the secure network's authentication server 115 via a cellular tower 120. It should be noted that for these embodiments, the mobile device 105 is also able to make non-secure calls 122 using the voice cellular connection 110 via a cellular tower 120.

In some embodiments, the mobile device 105 transmits the mobile device identifier to the secure network through a non-secure Wi-Fi connection 123. For these embodiments, the mobile device 105 transmits the mobile device identifier to the authentication server 115 via a Wi-Fi access point 125. It should be noted that in other embodiments, the mobile device 105 may use various communications means other than a cellular connection or a Wi-Fi connection to communicate the mobile device identifier out-of-band to the authentication server 115 and/or the mobile device manager 130 of the secure network. One example of this is where the mobile device user uses a different telephone to call a help desk operator, validates himself or herself to the help desk operator, tells the help desk operator the mobile device identifier, and has the help desk operator enter the mobile device identifier into the mobile device manager 130 and/or the authentication server 115. Alternatively, the mobile device user might access the secure network through a different remote system, validate himself or herself to that system, and then enter the mobile device identifier into the mobile device manager 130 and/or the authentication server 115.

The mobile device identifier provides a means for the secure network to identify and verify the mobile device 105. In one or more embodiments, the mobile device identifier is an Internet protocol (IP) address, a unique identification (ID) code, or a combination of both an IP address and a unique ID code, such as a secure device identifier or a phone number. In other embodiments, the mobile device identifier is or includes a random number that is generated by a random number generator algorithm that is contained in the previously downloaded mobile device security software. In some embodiments, the random number changes periodically, such as when the mobile device 105 moves, at specific time intervals, and/or between phone calls. In at least one embodiment, the random number changes from legitimate random numbers to false random numbers in order to confuse any possible eavesdroppers.

After the authentication server 115 receives the mobile device identifier, the authentication server 115 transmits the mobile device identifier to a mobile device manager 130 in the secure network. The mobile device manager 130 in conjunction with the authentication server 115 uses the mobile device identifier to identify and verify the mobile device 105. It should be noted that in some embodiments, the mobile device manager 130 in conjunction with the authentication server 115 also validates the user of the mobile device 105. For these embodiments, the mobile device manager 130 validates the mobile device 105 by using biometrics of the user and/or by determining whether the mobile device 105 is located at a legitimate location by using geolocation signals, such as global positioning system (GPS) signals.

After the mobile device manager 130 and the authentication server 115 identify, verify, and/or validate the mobile device 105 and optionally validate the user of the mobile device 105, the authentication server 115 transmits this information to an access router 135. Once the access router 135 receives this information, the secure network establishes a direct secure connection 136, 137 between the mobile device 105 and the access router 135 (i.e. the connection does not route through the authentication server 115) where the mobile device 105 can directly transmit and receive data to and from the secure network.

Once the data connection 136, 137 is established, the secure network is able to transmit encrypted secure data to the mobile device 105 via the data connection 136, 137. After the mobile device 105 receives the encrypted secure data, a processor in the mobile device 105 runs the mobile device security software to decrypt the encrypted secure data. In addition, if the user of the mobile device 105 wishes to transmit data to the secure network, a processor in the mobile device 105 will run the mobile device security software to encrypt the data. After the data is encrypted, the mobile device 105 will transmit the encrypted data to the secure network via the data connection 136, 137. It should be noted that in some embodiments, the mobile device manager 130 sends a request to the mobile device 105 for the mobile device identifier prior to the mobile device 105 transmitting the mobile device identifier to the secure network.

In this figure, the secure network is shown to also include secure data storage 140, remote desktop access systems 145, mobile web application systems 150, a web single sign-on system 155, and/or application database systems 172. The secure data storage 140 is shown in this figure to include a remote desktop access gateway system 160, a mobile web application gateway system 165, and a mobile application database gateway system 170.

After the secure network establishes a direct non-secure connection 136, 137 between the mobile device 105 and the access router 135, the mobile device 105 can still access the public internet 175. If the user of the mobile device 105 wishes to access the internet 175, the access router 135 will route the connection to the public internet 175 via a network address translator (NAT) system 180 and a web proxy system 185. A domain name system (DNS) server 190 is used to translate the domain names entered by the user into their corresponding numerical IP addresses.

In one or more embodiments of the present disclosure, a user of a non-secure mobile device 105 operating in a non-secure network is able to communicate secure data to and from another user of another non-secure mobile device 105 operating in a non-secure network by communicating via a secure network. This data can be various types of data including, but not limited to, voice data, video data, and text data. In these embodiments, a first user of a first mobile device 105 and a second user of a second mobile device (not shown) already have a direct connection 136, 137 established to the secure network such that both mobile devices 105 can directly transmit and receive data to and from the secure network.

For these embodiments, if the first user of the first mobile device 105 wishes to transmit secure data to the second user of the second mobile device, a processor in the first mobile device 105 will run the mobile device secure software to encrypt the data. Once the data is encrypted, the first mobile device 105 will transmit the encrypted data to the access router 135 in the secure network via data connection 136, 137. The access router 135 will then transmit the encrypted data via a direct data connection to the second mobile device. After the second mobile device receives the encrypted data, a processor in the second mobile device will run the mobile security software to decrypt the encrypted data so that the second user can understand the data.

It should be noted that if the first mobile device 105 initially has a direct connection 136, 137 established to the secure network, but the second mobile device does not, the first mobile device 105 can still communicate secure data to the second mobile device via the secure network. For these cases, if the first user of the first mobile device 105 wishes to transmit secure data to the second user of the second mobile device, a processor in the first mobile device 105 will run the mobile device secure software to encrypt the data. Once the data is encrypted, the first mobile device 105 will transmit the encrypted data to the access router 135 in the secure network via data connection 136, 137.

After the access router 135 receives the encrypted data, the access router 135 determines whether the second mobile device already has a direct connection established to the network. After the access router 135 determines that the second mobile device does not already have a direct connection established to the network, the access router 135 will then transmit a request to the second mobile device to send its mobile device identifier to the secure network for verification. After the second mobile device receives the request, the second mobile device sends its mobile device identifier to the authentication server 115. The secure network then performs the previously described procedure to establish a direct secure connection from the second mobile device to the secure network. Once a direct secure connection is established from the second mobile device to the secure network, the access router 135 transmits the encrypted data to the second mobile device. After the second mobile device receives the encrypted data, a processor in the second mobile device will run the mobile security software to decrypt the encrypted data.

Figure 2:
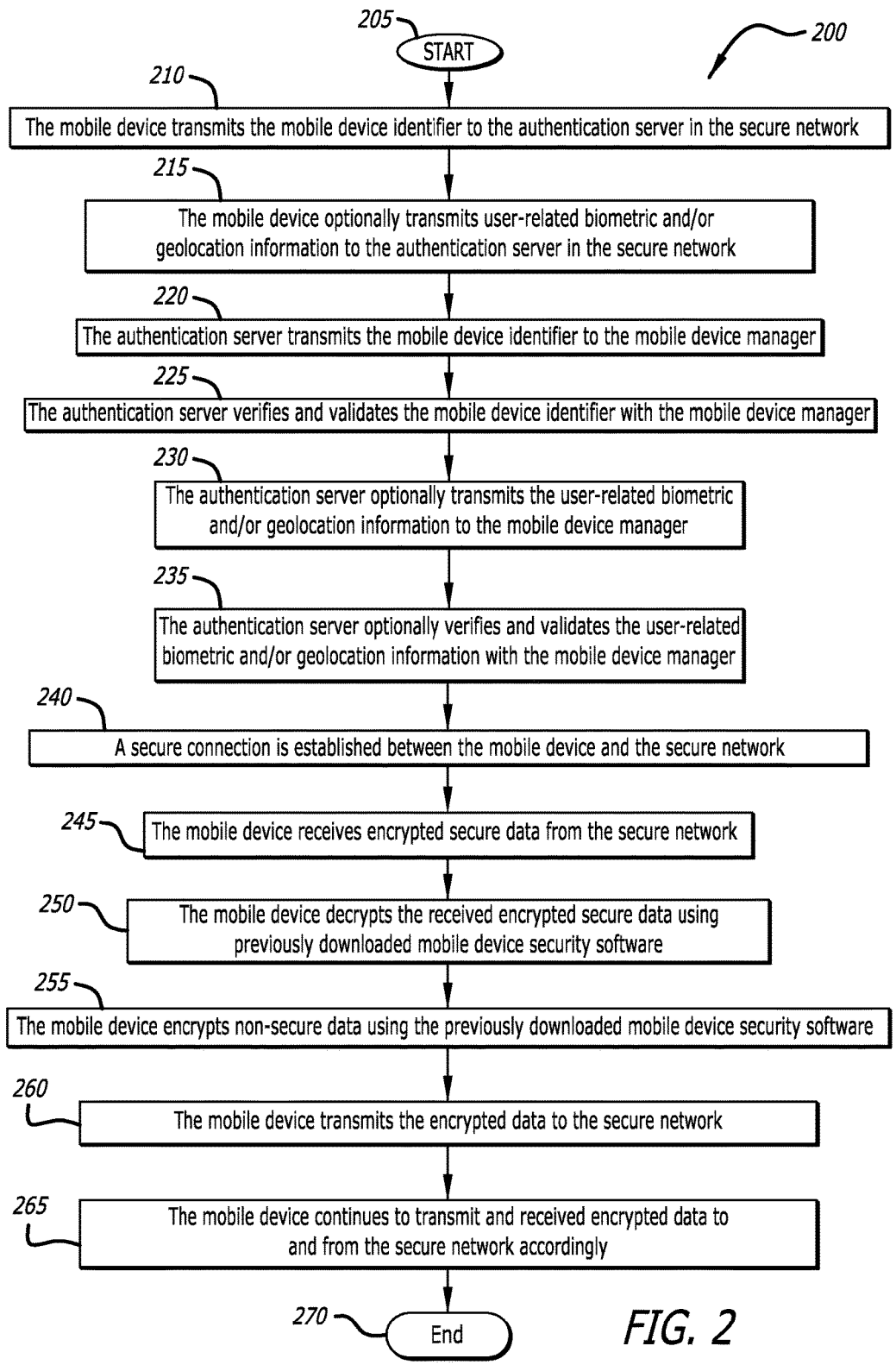
FIG. 2 shows a flow chart for the operation of the system depicted in FIG. 1, in accordance with at least one embodiment of the present disclosure.

FIG. 2 shows a flow chart 200 for the operation of the system depicted in FIG. 1, in accordance with at least one embodiment of the present disclosure. At the start 205 of the process, a mobile device transmits its mobile device identifier to an authentication server in the secure network 210. Optionally, the mobile device transmits user-related biometric and/or geolocation information to the authentication server in the secure network 215. The authentication server then transmits the mobile device identifier to a mobile device manager 220. The authentication server then verifies and validates the mobile device identifier with the mobile device manager 225.

The authentication server optionally transmits the user-related biometric and/or geolocation information to the mobile device manager 230. Then, the authentication server optionally verifies and validates the user-related biometric and/or geolocation information with the mobile device manager 235.

Then, a secure connection is established between the mobile device and the secure network 240. Then, the mobile device receives encrypted secure data from the secure network 245 via the established connection. After the mobile device receives the encrypted secure data, the mobile device decrypts the received encrypted secure data using previously downloaded mobile device security software 250. Then, the mobile device encrypts non-secure data that it will transmit to the secure network, using the previously downloaded mobile device security software 255. After the mobile device encrypts the non-secure data, the mobile device transmits the encrypted data to the secure network 260. The mobile device will continue to transmit and receive encrypted data to and from the secure network accordingly 265. The process then ends 270.

Figure 3A:
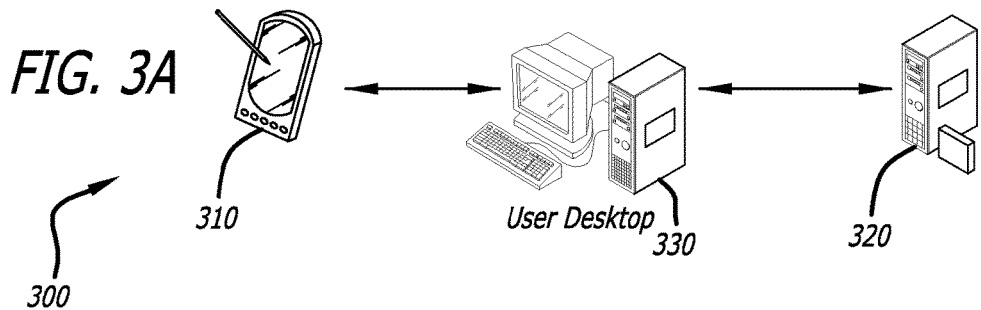
FIGS. 3A and 3B show the processes for a non-secure mobile device to obtain mobile device security software and a mobile device identifier, in accordance with at least one embodiment of the present disclosure.
Figure 3B:
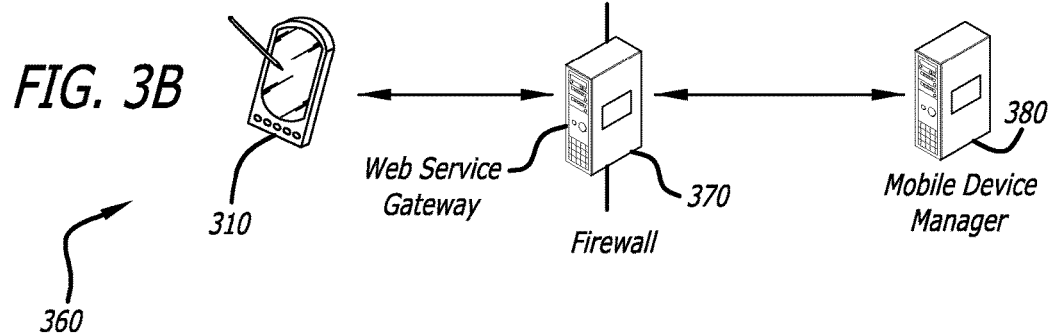

FIGS. 3A and 3B show the processes for a non-secure mobile device to obtain mobile device security software and a mobile device identifier, in accordance with at least one embodiment of the present disclosure. In particular, FIG. 3A shows a diagram 300 of a non-secure mobile device 310 downloading and installing mobile device security software as well as activating the mobile device security software on the mobile device 310, in accordance with at least one embodiment of the present disclosure. In this figure, a mobile device 310 first sends a request to the secure network 320, optionally via a user desktop computer 330, to download and install mobile device security software. It should be noted that this request could alternatively be made to the secure network 320 in an out-of-band manner, such as by a secure network operator who has obtained the necessary information for authorizing and enabling the mobile device 310. After the secure network 320 receives the request, the secure network 320 allows the mobile device 310 to download and install the mobile device security software. After the mobile device 310 downloads and installs the mobile device security software, optionally via the user desktop computer 330, the mobile device 310 activates the mobile device security software on the mobile device 310.

FIG. 3B shows a diagram 360 of a non-secure mobile device 310 transmitting a mobile device manager enrollment request and receiving a mobile device identifier, in accordance with at least one embodiment of the present disclosure. In this figure, the mobile device 310 first transmits a mobile device enrollment request to the secure network. A web service gateway 370 is optionally used to translate the mobile device manager enrollment request for the mobile device manager 380 in the secure network. After the mobile device manager 380 receives the request, the mobile device manager 380 validates the mobile device 310 based on the unique data item description (UDID) of the mobile device 310. After the mobile device manager 380 has validated the mobile device 310, the mobile device manager 380 transmits a mobile device identifier to the mobile device 310, optionally via the web service gateway 370.

In some embodiments, once the mobile device manager 380 has validated the mobile device 310, the mobile device manager 380 includes the phone number of the mobile device on a carrier access list. Mobile devices 310 having their phone numbers on the carrier access list will have communications to the secure network via a direct secure connection.

Figure 4:
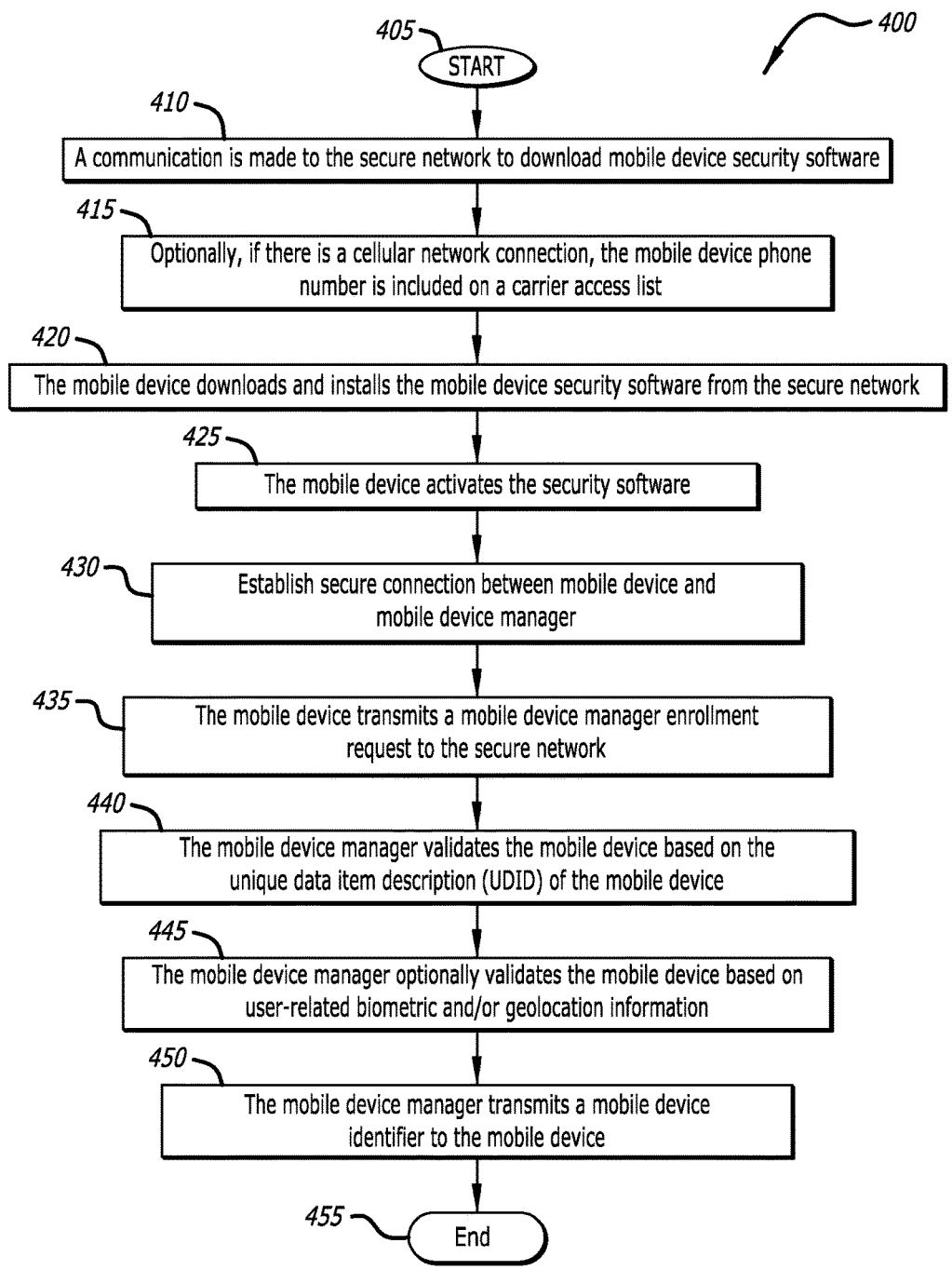
FIG. 4 shows a flow chart for the processes illustrated in FIGS. 3A and 3B, in accordance with at least one embodiment of the present disclosure.

FIG. 4 shows a flow chart 400 for the processes illustrated in FIGS. 3A and 3B, in accordance with at least one embodiment of the present disclosure. At the start 405 of the process, a communication is made to the secure network to download mobile device security software 410. Optionally, if there is a cellular network connection, the mobile device phone number is included on a carrier access list 415. Then, the mobile device downloads and installs the mobile device security software from the secure network 420. After the mobile device downloads and installs the mobile device security software, the mobile device activates the security software 425.

Then, a secure connection is established between the mobile device and the mobile device manager 430. The mobile device then transmits a mobile device enrollment request to the secure network 435. The mobile device manager validates the mobile device based on the UDID of the mobile device 440. The mobile device optionally validates the mobile device based on user-related biometric and/or geolocation information 445. After the mobile device manager validates the mobile device, the mobile device manager transmits a mobile device identifier to the mobile device 450. After the mobile device manager transmits the mobile device identifier, the process ends 455.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for establishing communications with a secure network using a non-secure mobile device operating in a non-secure network, the method comprising:
   transmitting a mobile device identifier to an authentication server in the secure network without transmitting the mobile device identifier through an access router in the secure network prior to reaching the authentication server;
   after the transmitting of the mobile device identifier, validating, with a mobile device manager in conjunction with the authentication server in the secure network, the mobile device identifier;
   after the validating of the mobile device identifier, transmitting, by the authentication server, validation information to the access router in the secure network;
   after the access router in the secure network receives the validation information, establishing, by the secure network, a direct secure connection between the non-secure mobile device and the secure network via the access router; and
   including, with the mobile device manager, a phone number of the mobile device on a carrier access list,
   wherein subsequent encrypted data transmissions from mobile devices having their phone numbers on the carrier access list will be automatically routed to the secure network.

2. The method of claim 1, wherein the mobile device identifier is communicated to the secure network via at least one of a cellular network, a Wi-Fi network, and an out-of-band network.

3. The method of claim 1, wherein the method further comprises sending, with the mobile device manager, a request for the mobile device identifier.

4. The method of claim 1, wherein the mobile device identifier is an Internet protocol (IP) address.

5. The method of claim 1, wherein the mobile device identifier is a unique identification (ID) code.

6. The method of claim 1, wherein the method further comprises validating, with the mobile device manager, a user of the mobile device.

7. The method of claim 6, wherein the user of the mobile device is validated by using biometrics of the user.

8. The method of claim 1, wherein the mobile device is validated by determining a location of the mobile device.

9. The method of claim 1, wherein the method further comprises:
   receiving, with the mobile device, encrypted secure data from the secure network; and decrypting, with the mobile device, the received encrypted secure data using mobile device security software.

10. The method of claim 1, wherein the method further comprises:
encrypting, with the mobile device, non-secure data using mobile device security software; and
transmitting, with the mobile device, the encrypted data to the secure network.

11. The method of claim 1, wherein the authentication server and the access router are located in a demilitarized zone (DMZ).

12. A non-secure mobile device operating in a non-secure network used for establishing communications with a secure network, the mobile device comprising:
a transmitter, wherein the transmitter is configured for transmitting a mobile device identifier to an authentication server in the secure network without transmitting the mobile device identifier through an access router in the secure network prior to reaching the authentication server,
wherein the mobile device identifier allows for the non-secure mobile device to establish a direct secure connection with the secure network via the access router, when a mobile device manager in conjunction with the authentication server validate the mobile device identifier and after the authentication server transmits validation information to the access router in the secure network,
wherein the mobile device manager is configured to include a phone number of the mobile device on a carrier access list,
wherein subsequent encrypted data transmissions from mobile devices having their phone numbers on the carrier access list will be automatically routed to the secure network;
a receiver, wherein the receiver is configured for receiving encrypted secure data from the secure network; and
a processor, wherein the processor is configured for decrypting the received encrypted secure data using mobile device security software.

13. The mobile device of claim 12, wherein the mobile device security software comprises at least one of encryption software, decryption software, and forced fixed destination addressing software.

14. The mobile device of claim 12, wherein the transmitter communicates the mobile device identifier to the authentication server in the secure network via at least one of a cellular network, a Wi-Fi network, and an out-of-band network.

15. The mobile device of claim 12, wherein the mobile device identifier is an Internet protocol (IP) address.

16. The mobile device of claim 12, wherein the mobile device identifier is a unique identification (ID) code.

17. The mobile device of claim 12, wherein the processor is further configured for encrypting non-secure data using the previously downloaded mobile device security software, and
wherein the transmitter is further configured for transmitting the encrypted data to the secure network.

18. A method for establishing communications with a secure network using a non-secure mobile device operating in a non-secure network, the method comprising:
transmitting a mobile device identifier to an authentication server in the secure network without transmitting the mobile device identifier through an access router in the secure network prior to reaching the authentication server to establish a secure connection between the non-secure mobile device and the secure network, when a mobile device manager in conjunction with the authentication server validate the mobile device identifier;
after the mobile device identifier is validated, transmitting, by the authentication server, validation information to the access router in the secure network;
after the authentication server transmits the validation information to the access router in the secure network, establishing a direct secure connection between the non-secure mobile device and the secure network via the access router; and
including, with the mobile device manager, a phone number of the mobile device on a carrier access list,
wherein subsequent encrypted data transmissions from mobile devices having their phone numbers on the carrier access list will be automatically routed to the secure network.

19. A method for establishing communications with a secure network using a non-secure mobile device operating in a non-secure network, the method comprising:
receiving, by an authentication server in the secure network, a request with a mobile device identifier to establish a secure connection between the non-secure mobile device and the secure network, wherein the request is not transmitted through an access router in the secure network prior to reaching the authentication server;
after the receiving of the request, validating, with a mobile device manager in conjunction with the authentication server in the secure network, the mobile device identifier;
after the validating of the mobile device identifier, transmitting, by the authentication server, validation information to the access router in the secure network;
after the authentication server transmits the validation information to the access router in the secure network, establishing a direct secure connection between the mobile device and the secure network via the access router; and
including, with the mobile device manager, a phone number of the mobile device on a carrier access list,
wherein subsequent encrypted data transmissions from mobile devices having their phone numbers on the carrier access list will be automatically routed to the secure network.

20. The method of claim 19, wherein the mobile device is operating in at least one of a cellular network and a Wi-Fi network.

21. The method of claim 19, wherein the method further comprises sending, with the mobile device manager, a request for the mobile device identifier.

22. The method of claim 19, wherein the mobile device identifier is an Internet protocol (IP) address.

23. The method of claim 19, wherein the mobile device identifier is a unique identification (ID) code.

24. The method of claim 19, wherein the method further comprises validating, with the mobile device manager, a user of the mobile device.

25. The method of claim 19, wherein the method further comprises:
transmitting, with a transmitter, encrypted secure data from the secure network to the mobile device.

26. The method of claim 19, wherein the method further comprises:

receiving, with the receiver, encrypted data transmitted from the mobile device; and decrypting, with a processor, the received encrypted data.

27. The method of claim 24, wherein the user of the mobile device is validated by using biometrics of the user.

28. The method of claim 19, wherein the mobile device is validated by determining a location of the mobile device.

29. A method for allowing for the establishment of communications with a secure network using a non-secure mobile device operating in a non-secure network, the method comprising:

communicating a request to the secure network to download mobile device security software;

downloading and installing, by the mobile device, the mobile device security software from the secure network;

activating, by the mobile device, the mobile device security software;

transmitting, with the mobile device, a mobile device manager enrollment request to the secure network;

validating, with a mobile device manager, the mobile device based on a unique data item description (UDID) of the mobile device;

transmitting, by the mobile device manager, a mobile device identifier to the mobile device, wherein the mobile device identifier allows for the non-secure mobile device to establish communications directly with the secure network via an access router, after an authentication server receives the mobile device identifier from the mobile device and after the authentication server transmits validation information to the access router in the secure network, wherein the mobile device identifier is not transmitted through the access router in the secure network prior to reaching the authentication server, and the mobile device manager in conjunction with the authentication server validate the mobile device identifier; and including, with the mobile device manager, a phone number of the mobile device on a carrier access list, wherein subsequent encrypted data transmissions from mobile devices having their phone numbers on the carrier access list will be automatically routed to the secure network.

30. A system for establishing communications with a secure network using a non-secure mobile device operating in a non-secure network, the system comprising:

the mobile device configured to transmit a mobile device identifier to an authentication server without transmitting the mobile device identifier through an access router in the secure network prior to reaching the authentication server;

the authentication server configured to receive the mobile device identifier, to transmit the mobile device identifier to a mobile device manager in the secure network, to validate the mobile device identifier with the mobile device manager, and to transmit validation information to the access router in the secure network; and the mobile device manager configured to validate the mobile device identifier with the authentication server, and configured to include a phone number of the mobile device on a carrier access list, wherein subsequent encrypted data transmissions from mobile devices having their phone numbers on the carrier access list will be automatically routed to the secure network, wherein a direct secure connection between the non-secure mobile device and the secure network is established via the access router, when the mobile device identifier is validated and after the authentication server transmits the validation information to the access router in the secure network.

31. The system of claim 30, wherein the mobile device is configured to communicate the mobile device identifier to the authentication server via at least one of a cellular network, a Wi-Fi network, and an out-of-band network.

32. The system of claim 30, wherein the mobile device manager is further configured to send a request to the mobile device for the mobile device identifier.

33. The system of claim 30, wherein the mobile device identifier is an Internet protocol (IP) address.

34. The system of claim 30, wherein the mobile device identifier is a unique identification (ID) code.

35. The system of claim 30, wherein mobile device manager is further configured to validate, with the authentication sever, a user of the mobile device.

36. The system of claim 35, wherein mobile device manager is further configured to validate, with the authentication sever, the user of the mobile device by using biometrics of the user.

37. The system of claim 30, wherein the mobile device manager is further configured to validate, with the authentication sever, the mobile device by determining a location of the mobile device.

38. The system of claim 30, wherein the mobile device is further configured to receive encrypted secure data from the secure network, and to decrypt the received encrypted secure data using mobile device security software.

39. The system of claim 30, wherein the mobile device is further configured to encrypt non-secure data using mobile device security software, and to transmit the encrypted data to the secure network.

40. A system for establishing communications with a secure network using a non-secure mobile device operating in a non-secure network, the system comprising:

the mobile device configured to transmit a request with a mobile device identifier to an authentication sever without transmitting the request through an access router in the secure network prior to reaching the authentication server to establish a secure connection between the non-secure mobile device and the secure network;

the authentication sever configured to receive the request with the mobile device identifier, to transmit the mobile device identifier to a mobile device manager in the secure network, to validate the mobile device identifier with the mobile device manager, and to transmit validation information to the access router in the secure network; and the mobile device manager configured to validate the mobile device identifier with the authentication server, and configured to include a phone number of the mobile device on a carrier access list, wherein subsequent encrypted data transmissions from mobile devices having their phone numbers on the carrier access list will be automatically routed to the secure network, wherein a direct secure connection between the mobile device and the secure network via the access router is established when the mobile device identifier is validated and after the authentication server transmits the validation information to the access router in the secure network.

41. The system of claim 40, wherein the mobile device is configured to operate in at least one of a cellular network and a Wi-Fi network.

42. The system of claim 40, wherein the mobile device manager is further configured to send a request for the mobile device identifier.

43. The system of claim 40, wherein the mobile device identifier is an Internet protocol (IP) address.

44. The system of claim 40, wherein the mobile device identifier is a unique identification (ID) code.

45. The system of claim 40, wherein the mobile device manager is further configured to validate, with the authentication server, a user of the mobile device.

46. The system of claim 45, wherein the mobile device manager is further configured to validate, with the authentication server, the user by using biometrics of the user.

47. The system of claim 40, wherein the system further comprises:
a transmitter configured to transmit encrypted secure data from the secure network to the mobile device.

48. The system of claim 40, wherein the system further comprises:
a receiver configured to receive encrypted data transmitted from the mobile device; and
a processor configured to decrypt the received encrypted data.

49. The system of claim 40, wherein the mobile device manager is further configured to validate, with the authentication sever, the mobile device by determining a location of the mobile device.

50. A system for allowing for the establishment of communications with a secure network using a non-secure mobile device operating in a non-secure network, the system comprising:
the mobile device configured to communicate a request to a mobile device manager in the secure network via an authentication server to download mobile device security software, configured to download and install the mobile device security software received from the mobile device manager, configured to activate the mobile device security software, and configured to transmit a mobile device manager enrollment request to the mobile device manager via the authentication server; and
the mobile device manager configured to validate the mobile device based on a unique data item description (UDID) of the mobile device, and configured to transmit a mobile device identifier to the mobile device, and configured to include a phone number of the mobile device on a carrier access list, wherein subsequent encrypted data transmissions from mobile devices having their phone numbers on the carrier access list will be automatically routed to the secure network,
wherein the mobile device identifier allows for the non-secure mobile device to establish direct communications with the secure network via an access router, after the authentication server receives the mobile device identifier from the mobile device, wherein the mobile device identifier is not transmitted through the access router in the secure network prior to reaching the authentication server, and the mobile device manager in conjunction with the authentication server validate the mobile device identifier and after the authentication server transmits validation information to the access router in the secure network.

51. A system for establishing communications with a secure network using a non-secure mobile device operating in a non-secure network, the system comprising:
a mobile device manager in the secure network,
wherein the mobile device manager is configured to validate, with an authentication server, a mobile device identifier associated with the non-secure mobile device, and configured to include a phone number of the mobile device on a carrier access list, wherein subsequent encrypted data transmissions from mobile devices having their phone numbers on the carrier access list will be automatically routed to the secure network,
wherein a direct secure connection between the non-secure mobile device and the secure network is established via an access router, after the authentication server receives the mobile device identifier from the mobile device, wherein the mobile device identifier is not transmitted through the access router in the secure network prior to reaching the authentication server, after the mobile device manager in conjunction with the authentication server validate the mobile device identifier, and after the authentication server transmits validation information to the access router in the secure network.

52. The system of claim 51, wherein the mobile device manager is further configured to send a request to the mobile device for the mobile device identifier.

53. The system of claim 51, wherein the mobile device identifier is an Internet protocol (IP) address.

54. The system of claim 51, wherein the mobile device identifier is a unique identification (ID) code.

55. The system of claim 51, wherein mobile device manager is further configured to validate, with the authentication sever, a user of the mobile device.

56. The system of claim 55, wherein mobile device manager is further configured to validate, with the authentication sever, the user of the mobile device by using biometrics of the user.

57. The system of claim 51, wherein the mobile device manager is further configured to validate, with the authentication sever, the mobile device by determining a location of the mobile device.

58. A secure network used for establishing communications with a non-secure mobile device operating in a non-secure network, the secure network comprising:
an authentication server to receive a mobile device identifier, associated with the mobile device, from the mobile device, wherein the mobile device identifier is not transmitted through an access router in the secure network prior to reaching the authentication server;
a mobile device manager configured to validate, with the authentication server, the mobile device identifier associated with the mobile device, and configured to include a phone number of the mobile device on a carrier access list, wherein subsequent encrypted data transmissions from mobile devices having their phone numbers on the carrier access list will be automatically routed to the secure network,
wherein a direct secure connection between the non-secure mobile device and the secure network is established via the access router, when the mobile device identifier is validated and after the authentication server transmits validation information to the access router in the secure network; and
application and database systems.

59. The secure network of claim 58, wherein the mobile device manager is further configured to send a request to the mobile device for the mobile device identifier.

60. The secure network of claim 58, wherein the mobile device identifier is an Internet protocol (IP) address.

61. The secure network of claim 58, wherein the mobile device identifier is a unique identification (ID) code.

62. The secure network of claim 58, wherein mobile device manager is further configured to validate, with the authentication sever, a user of the mobile device.

63. The secure network of claim 62, wherein mobile device manager is further configured to validate, with the authentication sever, the user of the mobile device by using biometrics of the user.

64. The secure network of claim 58, wherein the mobile device manager is further configured to validate, with the authentication sever, the mobile device by determining a location of the mobile device.

65. The secure network of claim 58, wherein the secure network further comprises at least one of a secure data storage, a remote desktop access system, a mobile web application system, a mobile application database system, and a web single sign-on system.

* * * * *

UNITED STATES PATENT AND TRADEMARK OFFICE
CERTIFICATE OF CORRECTION

PATENT NO. : 10,277,630 B2
APPLICATION NO. : 13/153290
DATED : April 30, 2019
INVENTOR(S) : Wen Fang Page 1 of 1

It is certified that error appears in the above-identified patent and that said Letters Patent is hereby corrected as shown below:

In the Claims

Column 12, Line 47, Claim 40 change "the authentication sever configured" to --the authentication server configured--

Signed and Sealed this
Fourteenth Day of April, 2020

Andrei Iancu
*Director of the United States Patent and Trademark Office*